May 13, 1952
M. C. SUTTON
2,596,184
METHOD OF BUILDING AND SHAPING
PLASTIC PRODUCTS WITHOUT MOLDS
Filed Feb. 27, 1950
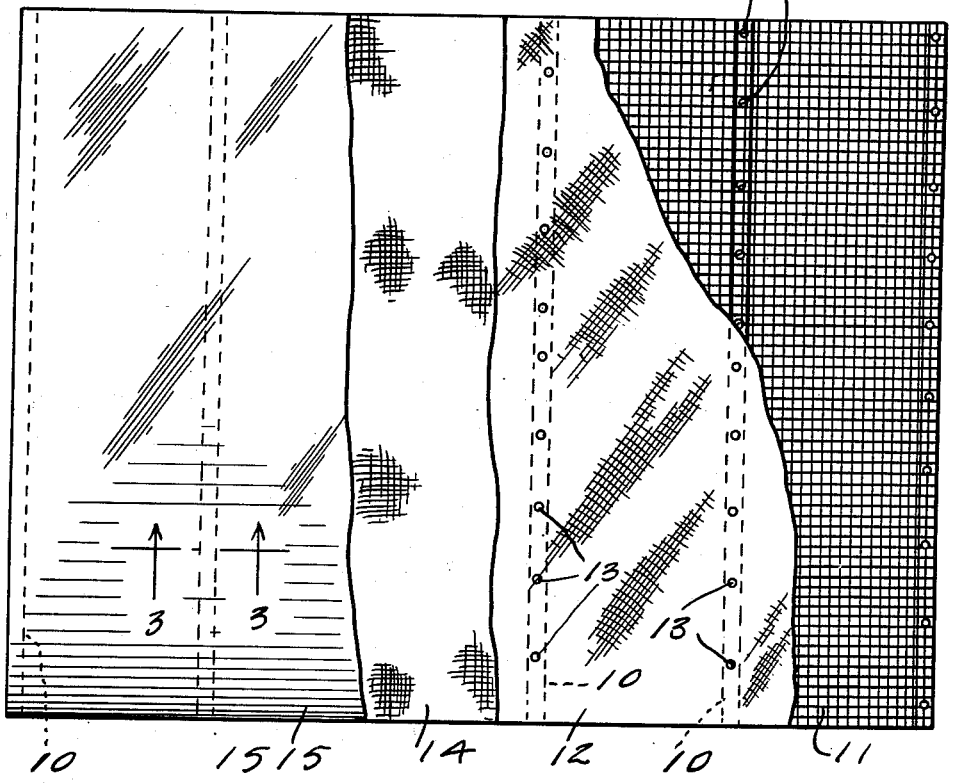
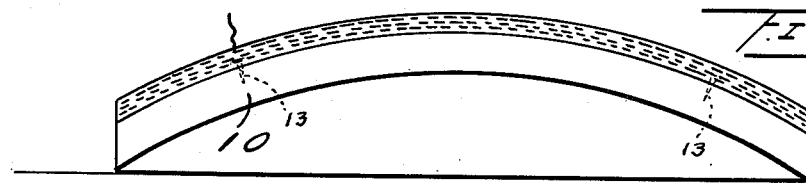
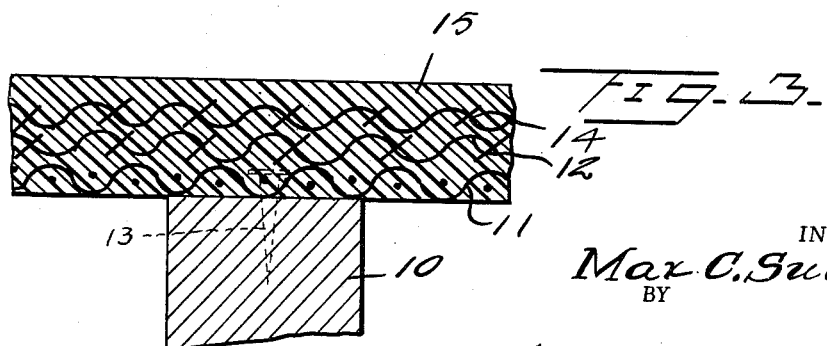
INVENTOR.
Max C. Sutton
BY
Kimmel & Crowell Attys.

Patented May 13, 1952

2,596,184

UNITED STATES PATENT OFFICE 2,596,184

METHOD OF BUILDING AND SHAPING PLASTIC PRODUCTS WITHOUT MOLDS

Max C. Sutton, Pontiac, Mich.

Application February 27, 1950, Serial No. 146,509

6 Claims. (Cl. 9—6)

My invention relates to a method of building up a reinforced plastic laminate into a pre-designed shape, contour or form, without the use of molds.

An object of my invention is to provide an improved method of making a laminated reinforced plastic building material containing a thin pervious plastic or metal base, such as screen or conventional hardware-cloth, which is first bent and shaped over a pre-constructed skeleton frame into the form and contour of the object to be produced; one or more layers of fabric material laid smoothly over and fastened to said preshaped pervious material, and a binder consisting of a self hardening plastic resin with hardener or accelerator, applied while still in the liquid stage in a manner to entirely saturate and impregnate the layers of fabric material and the pervious metal or plastic base, so that upon hardening of said plastic resin the laminate becomes cemented into a permanent, single, hard, rigid material, forming the permanent outer walls or covering of the article or object being constructed, without the aid of molds.

More specifically, an object of my invention is to provide in combination a pervious flexible material, such as metal or plastic screen, conventional hardware-cloth, or the like, bent and shaped and fastened over a pre-constructed skeleton frame so as to form the desired exterior shape and contour of the object to be constructed; a fabric or fibrous material such as loosely woven cotton cloth, woven or matted glass fibers or the like, laid and fastened over the said preshaped pervious material so used as a forming base, and a suitable plastic resin binder, such as that described in detail in U. S. Patent No. 2,418,633 issued April 8, 1947, with hardener or accelerator similar to that described in detail in the U. S. Patent No. 2,423,042 issued June 24, 1947; the solution of the resin and accelerator being applied while still in the liquid state, by means of brush or spray in such manner as to saturate and impregnate the said fabric material and the hard-ware cloth, or other pervious material used as the forming base, so that upon solidifying the plastic resin will cement and bind them into a single, rigid, laminated material having the permanent form, shape and contour desired, without the use of molds.

The practice of my invention involves a flexible pervious plastic or metal sheet, such as conventional hardware-cloth, which serves both to reinforce and strengthen the material and also to serve as a forming base. This flexible pervious material is first bent and shaped over a pre-constructed skeleton frame to conform to the size, shape, form and contour of the object to be constructed. Over this pervious base so formed is then laid and fastened one or more layers of a fabric material such as loosely woven cotton cloth or woven or matted glass fibers, or the like. The number of layers and thickness of the fabric material used will depend upon the desired stiffness and rigidity of the article being constructed. A relatively thick and spongy fabric material will retain more plastic resin and create a more rigid wall of material upon hardening. In building articles such as small boats, house-trailer bodies, awnings, etc., one layer is usually sufficient. In order to obtain an extremely smooth surface, a thin porous cloth such as cheesecloth, may be stretched and fastened smoothly over the fabric material to hold down any loose or protruding strands or fibers. These superposed materials are then saturated and impregnated with a suitable self hardening liquid resin, similar to that described in U. S. Patent No. 2,418,633 issued April 8, 1947, with accelerator or hardener such as that described in U. S. Patent No. 2,423,042 issued June 24, 1947. As the resin with accelerator solidifies it cements and binds these laminated materials—including the hardware-cloth or other pervious shaping material used—into one rigid, hard, smooth-surfaced material and thus produces a finished plastic reinforced product without the use of molds.

The above and other objects of my invention and the method of construction involved will become apparent from the following specifications, the accompanying drawings and the claims hereinafter set forth, to-wit:

Figure 1 is a plan view partly broken away of a plastic reinforced laminated material, constructed according to this invention.

Figure 2 is an end elevation of said material.

Figure 3 is a fragmentary sectional view on an enlarged scale, taken on the line 3—3 of Figure 1.

In carrying out this invention a flexible sheet of pervious material 11, such as plastic or metal screen, conventional hardware cloth or the like having spaced interstices, is first bent and formed over a preconstructed skeleton frame 10, to conform to the shape, size, contour and design of the product to be constructed and held in position by fastening elements 13, such as tacks, staples, welding, etc. By the term conventional hardware cloth reference is made to heavy wire screen material formed with a relatively large mesh, such as one-fourth or one-half inch, customarily used for screening grain, gravel, etc. and which is characterized by being strong and stiff. Under certain conditions where a resilient characteristic and the difference in cost are not objectionable plastic screen material formed to a stiffness comparable to the stiffness of hardware cloth may be used. A fabric or fibrous material 12 such as loosely woven cotton cloth, compressed or woven glass fibers, or the like, is then laid and fastened over the said pervious metal or plastic forming base. If an exceptionally smooth and glossy exterior surface is desired, then a thin porous cloth 14 such as cheesecloth may be stretched and fastened over the absorbent materials 12. The absorbent materials 12 and 14 and the pervious forming material 11 are then saturated and impregnated with self hardening plastic resin with hardener 15, while it is still in the liquid state so that the resin will flow between the squares of the mesh and by capillarity phenomena level itself so as to completely fill all voids in the superposed absorbent and pervious materials. Upon hardening, this resin with accelerator cements and binds these superposed materials 11, 12, 14 and 15 into a single, solid, rigid laminated material, having the desired contour, shape and design, without the use of molds.

The plastic resin with hardener 15 may be applied to the superposed materials 11, 12 and 14 by means of spray-gun, brush or otherwise, so that a relatively thick wall will be provided within which the sheets 11, 12 and 14 will be embedded and firmly and permanently cemented and bound together as the plastic resin with hardener solidifies, thus creating a means of constructing plastic reinforced laminate, articles having any desired size, shape, angles, contour or design, without the use of molds.

In preparation of the plastic resin 15 with accelerator, the following ingredients may be used and combined together at approximate room temperature 80 degrees F., to-wit:

Resin (polyester) -------- 100 parts
Styrene ----------------- 5 to 30 parts
Asbestos ---------------- 5 to 20 parts
Catalyst ---------------- 1 to 2% by weight on resin plus styrene
Hardener or accelerator -- ½ to 2% by weight on resin plus styrene In preparing the blend, the catalyst is first dissolved completely in the styrene. This styrene-catalyst solution is then thoroughly bended, preferably by mechanical agitation, with the resin and while still under agitation the asbestos is slowly added, making sure it is thoroughly wetted and dispersed. When ready to utilize the blend, the hardener or accelerator is stirred in, making sure it is mixed uniformly throughout the blend. Color pigments may be added as desired. If 1% accelerator or hardener is used, hardening will begin in about 35 minutes at room temperature 80 degrees F. If it is cut back to ½% then hardening will occur in 3 to 4 hours under the same conditions.

A suitable resin is a composition which is described in detail in U. S. Patent No. 2,418,633 issued April 8, 1947, Treatment of Unsaturated Alkyd Resins With a Monohydric Alcohol. A method of treating a polymerizable unsaturated alkyd resin having an acid numer below about 150 which comprises heating such resin with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the propylized alkyd with acetic anhydride to esterify free hydroxyl groups. A suitable catalyst is a composition described in detail in U. S. Patent No. 2,298,405 issued October 13, 1942, Cycloalkanyl Peroxide and Process of Producing the Same, which recites a cycloalkanyl peroxide, and a suitable hardener or accelerator is described in detail in U. S. Patent No. 2,423,042 issued June 24, 1947. Polymerizable mixed ester of an unsaturated polycarboxylic acid, phthalic acid, and a lower aliphatic glycol which calls for the polymerizable mixed ester of an unsaturated alpha beta polycarboxylic acid and about 0.05 to 0.35 mole of phthalic acid and about 0.5 to 1.5 moles of ethylene glycol per mole of said unsaturated acid.

The numeral 13 indicates tacks or similar means illustrating further how the hardware cloth is used as a forming base, and these tacks are applied before the other layers of material are added.

What I claim is:

1. A method of constructing objects which comprises shaping a sheet of flexible pervious screen-like material over a suitable frame formed to substantially the configuration and contour of the object to be constructed, laying at least one layer of a porous material of the desired thickness over the said pervious material, laying a relatively thin smooth fabric material over said porous material, saturating said porous and said fabric materials with a self-hardening resin blend composed of an alkyd resin, a polymerizable mixed ester type of accelerator, a cycloalkanyl peroxide catalyst and styrene, said blend being applied at a temperature of approximately 80° F., and allowing said object to stand under atmospheric conditions for approximately four hours to allow said blend to harden.

2. A method of constructing objects which comprises shaping and fastening a flexible pervious material over a preconstructed skeleton frame to substantially the configuration of the desired object, laying and fastening over said pervious material at least one layer of an absorbent material, covering said absorbent material with a relatively thin smooth fabric covering, filling the interstices of said superposed materials with a self-hardening resin blend composed of an alkyd type resin, a polymerizable mixed ester type of accelerator, a cycloalkanyl peroxide type of catalyst and styrene, with said blend being applied at room temperature and under atmospheric conditions, and allowing said blend to harden.

3. A method of constructing under atmospheric pressure of a plastic boat hull having a waterproof outer surface which comprises the shaping and fastening of a flexible pervious material over a preconstructed skeleton frame, laying and fastening at least one layer of a porous material over said flexible material to the desired thickness, covering said porous material with at least one layer of a relatively thin fabric material to provide a relatively smooth outer surface, and saturating and impregnating all of said superposed materials with a blend of a suitable type of self-hardening plastic polymerizable resin having a polymerizable mixed ester type of accelerator, and a cycloalkanyl peroxide catalyst and allowing said object to stand for approximately four hours at approximately 80° F. under atmospheric conditions.

4. A method of constructing under atmospheric pressure of a plastic object having a waterproof outer surface which comprises the shaping and fastening of a pervious flexible material over a preconstructed skeleton frame, laying and fastening at least one layer of a porous material over said pervious flexible material to the desired thickness, covering said porous material with at least one layer of a relatively thin fabric material to provide a relatively smooth outer surface, and saturating and impregnating all of said superposed materials with a blend of a suitable type of self-hardening plastic polymerizable resin having a polymerizable mixed ester type of accelerator, and a cycloalkanyl peroxide catalyst and allowing said resin to set under atmospheric conditions to form said superposed materials into a unitary structure.

5. A plastic boat hull comprising a skeleton structure formed to the general configuration desired, said structure having spaced cross members, a layer of pervious flexible material shaped and secured to said skeleton structure, at least one layer of fibrous material superposed over said pervious layer, a fabric covering disposed over said fibrous layer, a resinous bonding material disposed throughout the interstices of said superposed materials and hardened to provide a unitary structure.

6. A plastic object comprising a skeleton structure, a layer of flexible screen-like material shaped and secured over said skeleton structure, a layer of fibrous material superposed over said screen-like layer, a fabric covering disposed over said fibrous layer, a resinous bonding material disposed throughout the interstices of said superposed materials and hardened to provide a unitary structure.

MAX C. SUTTON.

REFERENCES CITED

The following references are of record in the file of this patent:

UNITED STATES PATENTS

| Number | Name | Date |
|---|---|---|
| Re. 3,435 | Waters et al. | May 11, 1869 |
| 878,669 | Pianta | Feb. 11, 1908 |
| 2,495,640 | Muskat | Jan. 24, 1950 |